Patented July 4, 1939

2,164,334

UNITED STATES PATENT OFFICE 2,164,334

PRODUCTION OF MOTOR FUEL

Ernest M. Marks, Lansdowne, Pa., assignor to The Atlantic Refining Company, Philadelphia, Pa., a corporation of Pennsylvania No Drawing. Application September 8, 1937, Serial No. 162,873

3 Claims. (Cl. 196—52)

The present invention relates to the production of motor fuel, and relates more particularly to a method for improving the anti-knock value of gasoline distillates derived from petroleum.

A further object of this invention is the treatment of hydrocarbon oils, particularly straight-run or uncracked naphthas of low anti-knock value, for the improvement of the anti-knock value or octane number thereof. It is to be understood, however, that the process of the present invention is equally applicable for improving anti-knock value of cracked gasoline, and particularly cracked distillates having an undesirably low anti-knock value.

In accordance with the present invention a hydrocarbon mixture, for example, petroleum naphtha, is subjected to treatment with chlorine to effect at least partial chlorination of the naphtha. The treated mixture, which contains chlorinated and unchlorinated hydrocarbons, is then subjected to heating, preferably under elevated pressure, to cause what appears to be molecular rearrangement or isomerization of the chlorinated hydrocarbons to form branched-chain isomers, with little loss of chlorine from the hydrocarbons. The chlorinated, isomerized mixture is thereafter treated for the removal of the chemically combined chlorine, such treatment preferably being effected in the vapor phase. Finally, the dechlorinated product is freed of reaction products, such as HCl, and subjected to fractional distillation or other treatment to recover an improved anti-knock motor fuel having the desired volatility or boiling range.

In carrying out my process, I may effect chlorination of the hydrocarbons either in the liquid phase or the vapor phase, in the presence or absence of a catalyst or catalysts. The temperatures employed during chlorination may be atmospheric or higher, i. e., of the order of from about 60° F. to about 400° F., and preferably are within the range of from about 80° F. to about 150° F. Pressures employed during the chlorination step may be atmospheric or higher, depending upon the temperature and the desirability of carrying out the chlorination in either the liquid phase or the vapor phase. Pressures varying from atmospheric up to about 1000 lbs./sq. in., may be suitably employed. The chlorination treatment may be effected in the presence of one or more catalysts such as the chlorides of Fe, Mo, Sb, Sn, V, and Al; charcoal, phosphorus; sulfur; or ultra-violet light. In general the quantity of chlorine introduced into the hydrocarbons is of the order of from about 5% to about 20% by weight, but larger quantities, i. e., of the order of from 30% to 50% by weight, may be introduced into the hydrocarbons, depending upon the nature of the hydrocarbons and the conditions under which chlorination is effected.

In the second step of my process, i. e., the rearrangement or isomerization of the chlorinated hydrocarbon mixture, the chlorinated mixture is subjected to heating at temperatures within the range of from about 400° F. to about 1000° F., preferably under superatmospheric pressures of the order of from about 150 lbs./sq. in. to about 2500 lbs./sq. in., for a period of time of the order of from a minute or two to several hours. This step may require a period of only a few minutes at temperatures of from about 700° F. to about 1000° F., whereas, at lower temperatures, i. e., of the order of 400° F., the period may be a matter of several hours. In some cases, during this step, a small amount of combined chlorine, for example, 10% of that initially combined, is liberated in the form of HCl from the chlorinated mixture. However, in general, little chlorine is evolved during this step.

The chlorinated hydrocarbon mixture, after being subjected to the step aforesaid, is subjected to treatment for the removal of chemically combined chlorine from the hydrocarbons. Such removal may be accomplished by heating the chlorinated hydrocarbon mixture to a temperature within the range of from about 400° F. to about 1000° F., preferably at atmospheric or sub-atmospheric pressure, in the presence of one or more catalysts such as the chlorides and oxides of Fe, Al, Si, V, Zn, and Mo; fuller's earth; activated clay; bauxite; bentonite or other material capable of assisting dechlorination. The time required for dechlorination is generally less than about 1 minute, and, for example, when dechlorinating naphtha over fuller's earth at about 620° F., a period of from about 9 seconds to about 15 seconds proved satisfactory for effecting substantial dechlorination. In order to assist dechlorination, it may be desirable in some instances to employ hydrogen, in addition to or in lieu of the catalysts above mentioned. In any event, the combined chlorine is liberated from the chlorinated hydrocarbon mixture as HCl and may be recovered and converted to chlorine for further use. While it is desirable to dechlorinate the chlorinated hydrocarbon mixture substantially completely prior to fractionation to produce motor fuel of desired boiling range, it is not necessary that such dechlorination always be complete. It has been found that any residual chlorine retained in the hydrocarbons after dechlorination appears in the heavy residual oil, i. e., that boiling above the motor fuel boiling range when the dechlorinated hydrocarbons are subjected to fractional distillation or other suitable type of removal for the production of a motor fuel fraction.

After the chlorinated hydrocarbon mixture has been subjected to the above described treatment for the partial or total removal of chlorine therefrom, traces of dissolved HCl may be removed from the hydrocarbons by washing with an aqueous alkali solution and, if desired, with water. The substantially dechlorinated hydrocarbon mixture, free from dissolved HCl, may be fractionally distilled to separate a motor fuel fraction of the proper boiling range from low or high boiling hydrocarbons produced in the prior steps of the process. As pointed out hereinbefore, any chlorinated hydrocarbons which did not yield to the dechlorinating treatment, are usually high boiling and fairly stable, and are therefore concentrated in the bottoms or residue from the fractional distillation. In order to increase the ultimate yield of motor fuel free of chlorine and having the proper boiling range, the residue from the fractional distillation may be subjected to a further and more vigorous dechlorinating treatment, employing the same or different catalyst as or than was utilized in the initial dechlorinating step. For example, a chlorinated naphtha may be dechlorinated to the extent of about 70% of its initial chlorine content by passage over fuller's earth at 600° F. The partially dechlorinated product, upon fractional distillation, may yield 70% by volume of chlorine-free naphtha of the motor fuel boiling range and 30% by volume of residual oil containing the balance of the unliberated chlorine. This residual oil may then be subjected to a second and more vigorous dechlorination treatment consisting in the passage thereof over fuller's earth or other catalyst at a higher temperature, i. e., of the order of, for example, 800° F., whereby the remaining chlorine is substantially removed and the product may be fractionated to obtain additional motor fuel. In this manner the ultimate yield of motor fuel of improved antiknock value, and free of chlorine, may be increased.

My invention may be further illustrated by the following examples, in which a heavy straight-run petroleum naphtha of paraffinic nature having a boiling range of from 310° F. to 412° F., and an octane number of 30 was treated with gaseous chlorine at from 80° F. to 100° F., and at atmospheric pressure until varying amounts of chlorine had been chemically combined with the naphtha (11.8% and 19.8% by weight, respectively). The chlorinated naphthas were then washed with dilute aqueous sodium hydroxide solution (5%) to remove dissolved, unreacted chlorine and HCl, and finally water-washed and dried. The chlorinated naphthas were subjected to heat treatment for a period of about 4 hours at about 400° F., under a pressure of about 150 lbs./sq. in. The naphthas were then subjected to a dechlorination treatment consisting essentially in passing the naphthas, in the vapor phase, over fuller's earth (6 to 10 mesh, No. 1 grade) at from 590° F. to 643° F., and under atmospheric pressure, with a contact time of from 9 to 15 seconds. During this step a major portion of the combined chlorine was liberated as HCl and the liquid naphtha product was recovered as a pale yellow oil. In order to recover from this product a substantially chlorine-free motor fuel of the gasoline boiling range, the naphtha was treated with an aqueous alkali solution to remove traces of dissolved HCl and was then fractionally distilled to a predetermined vapor temperature. In the following table there are also included, for comparison, examples showing that simple distillation of the untreated petroleum naphtha, and fuller's earth treatment of the unchlorinated petroleum naphtha at from 607° F. to 666° F., failed to produce any change in the anti-knock value of the naphtha.

| Chlorinated naphtha | | Dechlorination | | | Product | |
| --- | --- | --- | --- | --- | --- | --- |
| Percent Cl combined | Percent Cl after isomerization | Temp., °F. | Catalyst | Percent Cl removed | Percent yield motor fuel | Octane number |
| 11.8 | 9.2 | 590–637 | Fuller's earth | 56.5 | 68.6 | 43.7 |
| 19.8 | 17.6 | 626–633 | do | 65.8 | 61.3 | 60.5 |
| 00.0 | 00.0 | 607–666 | do | 00.0 | 80.5 | 30.0 |
| 00.0 | 00.0 | None | None | 00.0 | 82.0 | 30.0 |

It will be seen from the above examples that chlorination of the naphtha, followed by heat treatment, dechlorination and fractional distillation, produced a marked increase in the octane number of the naphtha, whereas simple distillation or fuller's earth treatment of the initial untreated naphtha effected no change in the octane number. The motor fuels produced in accordance with my process may, if desired, be subjected to further treatment with chemical reagents including sulfuric acid, phosphoric acid, metallic halides such as AlCl₃ or ZnCl₂, adsorbent earths, and the like.

By modifying the conditions under which the various steps of my process are carried out, for example, the extent of chlorination; the temperature and pressure and time of the subsequent heat treatment; and the temperature, pressure, contact time and catalyst in the dechlorination step, my process may be adapted to the treatment of hydrocarbons heavier than naphtha, for example, kerosene, gas oil and higher boiling oils, preferably when such hydrocarbons are or have been subjected to cracking, thereby to produce motor fuels of improved anti-knock value.

What I claim is:

1. The method of producing gasoline of improved antiknock value, which comprises chlorinating petroleum naphtha having a relatively low antiknock value to produce chlorinated naphtha containing from about 5% to 20% by weight of chlorine, heating the chlorinated naphtha to a temperature of the order of from about 400° F. to about 1000° F., under a substantial superatmospheric pressure, then heating it under a pressure not substantially in excess of atmospheric, to a temperature of the order of from about 400° F. to about 1000° F., in the presence of a dechlorinating catalyst to effect substantial dechlorination of said naphtha, and separating from the dechlorinated products a gasoline fraction substantially free of chlorine.

2. The method of producing gasoline of improved antiknock value, which comprises chlorinating petroleum naphtha having a relatively low antiknock value to produce chlorinated naphtha containing from about 5% to about 20% by weight of chlorine, heating the chlorinated naphtha to a temperature of the order of from about 400° F. to about 1000° F., under a substantial superatmospheric pressure, then heating it under a pressure not substantially in excess of atmospheric, to a temperature of the order of from about 400° F. to about 1000° F., in the presence of fuller's earth to effect substantial dechlorination of said naphtha, and separating from the dechlorinated products a gasoline fraction substantially free of chlorine.

3. The method of producing gasoline of improved antiknock value, which comprises chlorinating petroleum naphtha having a relatively low antiknock value at a temperature of from about 80° F. to about 150° F. to produce chlorinated naphtha containing from about 5% to about 20% by weight of chlorine, heating the chlorinated naphtha to a temperature in excess of about 400° F., under a pressure in excess of about 150 lbs./sq. in., then heating it under a pressure not substantially in excess of atmospheric to a temperature in excess of about 600° F., in the presence of fuller's earth, to effect substantial dechlorination of said naphtha, and distilling from the dechlorinated products a gasoline fraction substantially free of chlorine.

ERNEST M. MARKS.